(12) United States Patent
Kim et al.

(10) Patent No.: US 9,408,120 B2
(45) Date of Patent: *Aug. 2, 2016

(54) WIRELESS COMMUNICATION SYSTEM FOR MONITORING WIRELESS LINKS DURING TRANSMISSION GAPS

(71) Applicant: Samsung Electronics Co., Ltd., Gyeonggi-do (KR)

(72) Inventors: Soeng-Hun Kim, Gyeonggi-do (KR); Gert Jan Van Lieshout, Middlesex (GB); Himke Van Der Velde, Middlesex (GB)

(73) Assignee: Samsung Electronics Co., Ltd. (KR)

( * ) Notice: Subject to any disclaimer, the term of this patent is extended or adjusted under 35 U.S.C. 154(b) by 42 days.

This patent is subject to a terminal disclaimer.

(21) Appl. No.: 14/196,544

(22) Filed: Mar. 4, 2014

(65) Prior Publication Data
US 2014/0185484 A1 Jul. 3, 2014

Related U.S. Application Data

(63) Continuation of application No. 11/972,408, filed on Jan. 10, 2008, now Pat. No. 8,705,497.

(30) Foreign Application Priority Data

Jan. 11, 2007 (GB) .................................. 0700555.6

(51) Int. Cl.
*H04W 4/00* (2009.01)
*H04B 7/00* (2006.01)
(Continued)

(52) U.S. Cl.
CPC .......... *H04W 36/0088* (2013.01); *H04W 24/10* (2013.01); *H04W 36/30* (2013.01);
(Continued)

(58) Field of Classification Search
None
See application file for complete search history.

(56) References Cited

U.S. PATENT DOCUMENTS 6,331,971 B1   12/2001   Raith
2003/0003906 A1   1/2003   Demers et al.
(Continued)

FOREIGN PATENT DOCUMENTS

EP   1 137 203   9/2001
EP   1292039   3/2003
(Continued)

OTHER PUBLICATIONS

UK Search Report dated May 16, 2012 issued in counterpart application No. 1207979.4.
(Continued)

*Primary Examiner* — Kiet Tang
(74) *Attorney, Agent, or Firm* — The Farrell Law Firm, P.C.

(57) ABSTRACT

A method and apparatus are provided for measuring a link quality by a User Equipment (UE) in a communication system. The method includes receiving, from a wireless access network, a control message including an s-Measure including a serving cell quality threshold and gap configuration information used for setting up and releasing measurement gaps; setting up a measurement gap configuration indicated by the gap configuration information; if a link quality related to a serving cell is lower than the serving cell quality threshold, measuring a link quality related to at least one neighboring cell during a period according to the measurement gap configuration; and transmitting, to the wireless access network, a measurement report including a result of the measuring.

24 Claims, 5 Drawing Sheets

(51) Int. Cl.
*H04W 36/00* (2009.01)
*H04W 24/10* (2009.01)
*H04W 36/30* (2009.01)
*H04W 36/08* (2009.01)
*H04W 76/04* (2009.01)
*H04W 52/02* (2009.01)
*H04W 36/34* (2009.01)

(52) U.S. Cl.
CPC .............. *H04W 36/08* (2013.01); *H04W 36/34* (2013.01); *H04W 52/0216* (2013.01); *H04W 52/0219* (2013.01); *H04W 76/048* (2013.01)

(56) References Cited

U.S. PATENT DOCUMENTS

| | | |
|---|---|---|
| 2003/0017842 A1 | 1/2003 | Moles et al. |
| 2004/0043769 A1 | 3/2004 | Amerga et al. |
| 2005/0239464 A1 | 10/2005 | Iacono |
| 2005/0254470 A1 | 11/2005 | Yashar |
| 2005/0286468 A1 | 12/2005 | Agin et al. |
| 2006/0111110 A1 | 5/2006 | Schwarz et al. |
| 2006/0223557 A1 | 10/2006 | Manohar |
| 2007/0037601 A1* | 2/2007 | Mittal ................ H04W 24/10 455/525 |
| 2007/0097914 A1 | 5/2007 | Grilli et al. |
| 2007/0214232 A1 | 9/2007 | Belimpasakis et al. |
| 2007/0230400 A1* | 10/2007 | Kuchibhotla ..... H04W 52/0216 370/331 |
| 2008/0069028 A1* | 3/2008 | Richardson ........... H04W 36/12 370/328 |

FOREIGN PATENT DOCUMENTS

| | | |
|---|---|---|
| GB | 2 314 734 | 1/1998 |
| GB | 2 314 737 | 1/1998 |
| WO | WO 02/067458 | 8/2002 |
| WO | WO 03/084256 | 10/2003 |
| WO | WO 2007/022127 | 2/2007 |
| WO | WO 2008/054270 | 5/2008 |
| WO | WO 2011/019159 | 2/2011 |

OTHER PUBLICATIONS

UK Search Report dated Apr. 18, 2007 issued in counterpart application No. 0700555.6.

UK Search Report dated Jun. 21, 2007 issued in counterpart application No. 0700555.6.

\* cited by examiner

WIRELESS COMMUNICATION SYSTEM FOR MONITORING WIRELESS LINKS DURING TRANSMISSION GAPS

PRIORITY

This application is a Continuation of U.S. application Ser. No. 11/972,408, which was filed in the U.S. Patent and Trademark Office on Jan. 10, 2008, and claims priority under 35 U.S.C. §119(a) to a Patent Application filed in the United Kingdom Intellectual Property Office on Jan. 11, 2007 and assigned serial No. 0700555.6, the entire disclosure of each of which is incorporated herein by reference.

BACKGROUND OF THE INVENTION

1. Field of the Invention

This invention relates to a wireless communication system and components thereof. In particular, this invention is concerned with controlling the measuring of the quality of wireless links. Such measurements are commonly a significant factor in determining whether or not a handover procedure should be performed.

2. Description of the Related Art

In order to determine whether or not a handover procedure is to be performed, handover-related measurements are performed for neighboring cells. Some of these measurements cannot be performed by a User Equipment (UE), e.g. a cellular phone, while the UE is also listening for data or transmitting data. Accordingly, in order to allow the UE to perform such measurements gaps in the transmission and reception of data are scheduled.

The original Universal Mobile Telecommunications System (UMTS) Wideband Code Division Multiple Access (WCDMA) standard specifies a static mechanism for scheduling the transmission/reception gaps in which the UE sends information to the Universal Terrestrial Radio Access Network (UTRAN) indicating whether transmission/reception gaps are required for various different types of measurement. The UTRAN then configures transmission/reception gaps in accordance with the received information, and sends a measurement control message to the UE indicating the gap configuration.

While the UMTS static mechanism is straightforward, the UMTS static mechanism lacks flexibility and does not fully take into account the differing measurement capabilities of different UE.

Another feature of the original UMTS WCDMA standard is power-saving connected mode states in which discontinuous reception/transmission (DRX/DTX) between the UE and the UTRAN occurs. In the power-saving connected mode states the UE controls handovers, i.e. the UE performs cell re-selection. In order to maximize the power saving by the UE handover-related measurements are performed in accordance with the DRX/DTX period.

Further, the UTRAN may transmit one or more 'Ssearch' parameters which are used by the UE to determine the frequency at which handover-related measurements are performed. In particular, the UE is only required to perform a measurement if the link quality of the existing link is below the Ssearch parameter for that measurement. Separate Ssearch parameters are defined for intra-frequency, inter frequency and inter-Radio Access Technology (RAT) measurements both for the case where Hierarchical Cell Structure (HCS) is employed and the case where HCS is not employed.

An Evolved Universal Terrestrial Radio Access (E-UTRA) scheme is presently being specified by the $3^{rd}$ Generation Partnership Project (3GPP). Some details of E-UTRA have already been agreed, see for example specification 3GPP TS 36.300 "Evolved Universal Terrestrial Radio Access (E-UTRA) and Evolved Universal Terrestrial Radio Access Network (E-UTRAN); Overall description; Stage 2", Release 8. In particular, it has been agreed that in a Radio Resource Control (RRC) connected mode:

the E-UTRAN sends dedicated messages to control the measurements to be performed by the User Equipment (UE);

measurements for which the UE requires transmission and/or reception gaps are classified as 'gap assisted';

measurement gaps are provided and controlled by the E-UTRAN, i.e. the UE cannot autonomously change the configuration of the gaps;

a discontinuous communication mode can be configured at Radio Link Control/Medium Access Control (RLC/MAC) level for UE power saving and efficient resource utilization; and the E-UTRAN controls the measurements to be performed by a UE.

It has been proposed that the UE provides further assistance in the gap configuration process. The motivation for this proposal is to take better account of the differing measurement capabilities of different UEs.

SUMMARY OF THE INVENTION

Accordingly, the present invention is designed to address at least the problems and/or disadvantages described above and to provide at least the advantages described below.

Accordingly, an aspect of the present invention is to provide a method for measuring a link quality by a UE in a communication system. The method includes receiving, from a wireless access network, a control message including an s-Measure including a serving cell quality threshold and gap configuration information used for setting up and releasing measurement gaps; setting up a measurement gap configuration indicated by the gap configuration information; if a link quality related to a serving cell is lower than the serving cell quality threshold, measuring a link quality related to at least one neighboring cell during a period according to the measurement gap configuration; and transmitting, to the wireless access network, a measurement report including a result of the measuring.

Another aspect of the present invention is to provide a UE in a communication system. The UE includes a transceiver configured to receive, from a wireless access network, a control message including an s-Measure including a serving cell quality threshold and gap configuration information used for setting up and releasing measurement gaps; and a controller configured to set up a measurement gap configuration indicated by the gap configuration information, if a link quality related to a serving cell is lower than the serving cell quality threshold, to measure a link quality related to at least one neighboring cell during a period according to the measurement gap configuration, and to control the transceiver to transmit, to the wireless access network, a measurement report including a result of the measurement.

BRIEF DESCRIPTION OF THE DRAWINGS

The above and other aspects, features and advantages of certain embodiments of the present invention will be more apparent from the following detailed description taken in conjunction with the accompanying drawings, in which.

DETAILED DESCRIPTION OF EMBODIMENTS OF THE INVENTION

Figure 1:
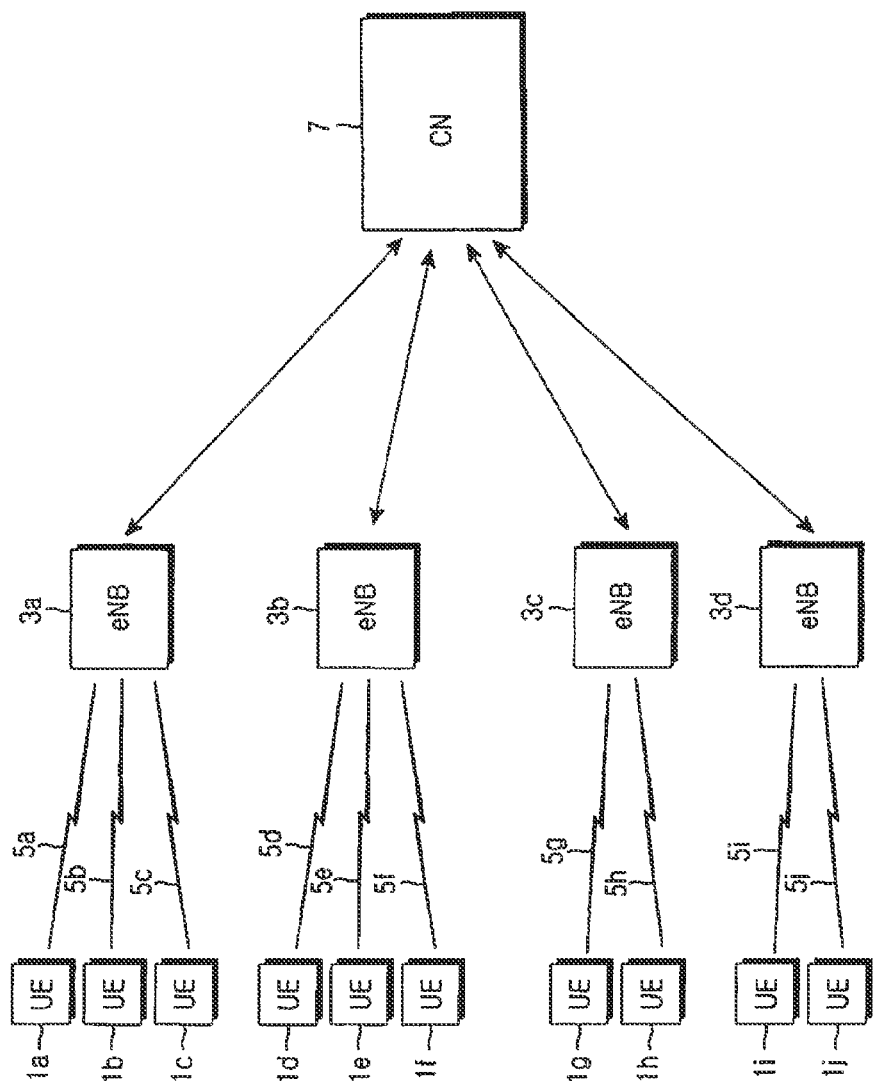
FIG. 1 is a diagram illustrating main components of a wireless communication system according to a first embodiment of the invention.

Hereinafter, various embodiments of the present invention will be described in detail with reference to the accompanying drawings. The same reference numerals denote identical structural elements throughout all the drawings. In the following description of the present invention, a detailed description of known functions and configurations incorporated herein will be omitted when it may make the subject matter of the present invention rather unclear.

A first embodiment of the present invention will be described in the context of a wireless communication system incorporating the proposed Evolved Universal Terrestrial Radio Access Network (E-UTRAN). As shown in FIG. 1, in such a wireless communication system, User Equipments (UEs) 1a-1j communicate with respective enhanced Node Bs (eNBs) 3a-3j via radio links 5a-5j. In this embodiment, the UEs 1 are cellular phones. Each eNB 3 is connected directly to the Core Network 7.

In this embodiment, the UEs 1 are also able to communicate with other Radio Access Technologies (RATs), for example the standard Universal Terrestrial Radio Access Network (UTRAN) and the Global System for Mobile communications (GSM) network. In this way, during implementation of the E-UTRAN the UEs can still work in areas without any eNBs.

Each eNB 3 communicates with UEs 1 in one or more cells. It is well known that as a UE 1 moves communication is handed over between cells. In this embodiment, the E-UTRAN determines when a handover procedure takes place and to which cell the communication is handed over, taking into account radio link quality factors and data traffic management factors.

In order to measure radio link quality factors, the UE 1 performs various measurements. For some of these measurements, the UE 1 is unable to listen for data or to transmit data at the same time, for example because the measurement is being performed in a different frequency range (an inter-frequency measurement) or the measurement is for a different radio access technology (an inter-RAT measurement). In order to allow such measurements to take place, a number of transmission and reception gaps are introduced into the existing radio link during which the UE 1 is free to perform measurements without having to monitor for or transmit data. As will be explained in more detail hereafter, in this embodiment when the UE 1 is connected to the E-UTRAN, the gap configuration is selected by the UE 1 from a set of candidate gap configurations provided by the E-UTRAN.

When the UE 1 is connected to the E-UTRAN, in order to conserve the power of the UE 1 and to enable efficient resource utilization, the connection can enter a power-saving mode in which discontinuous reception/transmission (DRX/DTX) occurs between the UE 1 and the E-UTRAN. As will also be explained in more detail hereafter, in this embodiment, in order to further conserve the power of the UE 1, if the signal quality of the existing radio link 5 between the UE1 and the eNB 3 exceeds a threshold set by the E-UTRAN, various handover-related measurements do not need to be performed.

Figure 2:
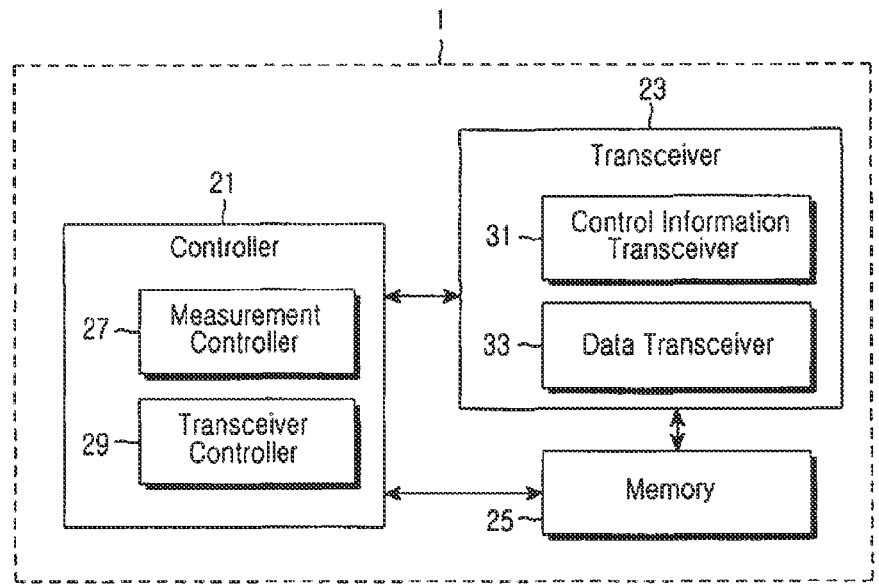
FIG. 2 is a diagram illustrating the main components of a user equipment forming a part of the wireless communication system illustrated in FIG. 1.

FIG. 2 shows the main components of a UE 1 that are related to the present invention. Other components, such as a microphone, a speaker, a display and a keypad, which are not related to the present invention, are not shown in FIG. 2 for clarity of illustration.

As shown in FIG. 2, the UE 1 has a controller 21, a transceiver 23 and memory 25. The controller 21 includes a measurement controller 27, which controls radio link quality measurements, and a transceiver controller 29, which controls operation of the transceiver 23. The transceiver 23 includes a control information transceiver 31, which handles communication of control data with the eNB 3 and reception of control data from the eNB 3, and a data transceiver 33, which handles communication of user data with the eNB 3 and the reception of user data from the eNB 3.

Figure 3:
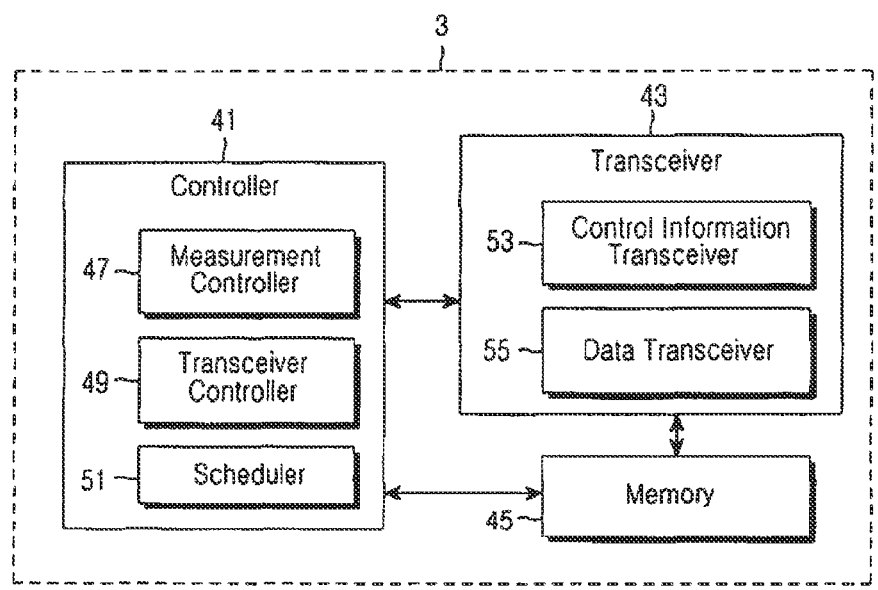
FIG. 3 is a diagram illustrating main components of an enhanced Node B forming part of the wireless communication system illustrated in FIG. 1.

FIG. 3 shows the main components of an eNB 3 that are related to the invention. As shown, the eNB 3 has a controller 41, a transceiver 43 and memory 45. The controller 41 includes a measurement controller 47, which controls radio link quality measurements performed by the eNB 3, a transceiver controller 49, which controls operation of the transceiver 43, and a scheduler 51. The transceiver 43 includes a control information transceiver 53, which handles the communication of control data with UEs 1, and a data transceiver 55, which handles the communication of user data with UEs 1.

Figure 4:
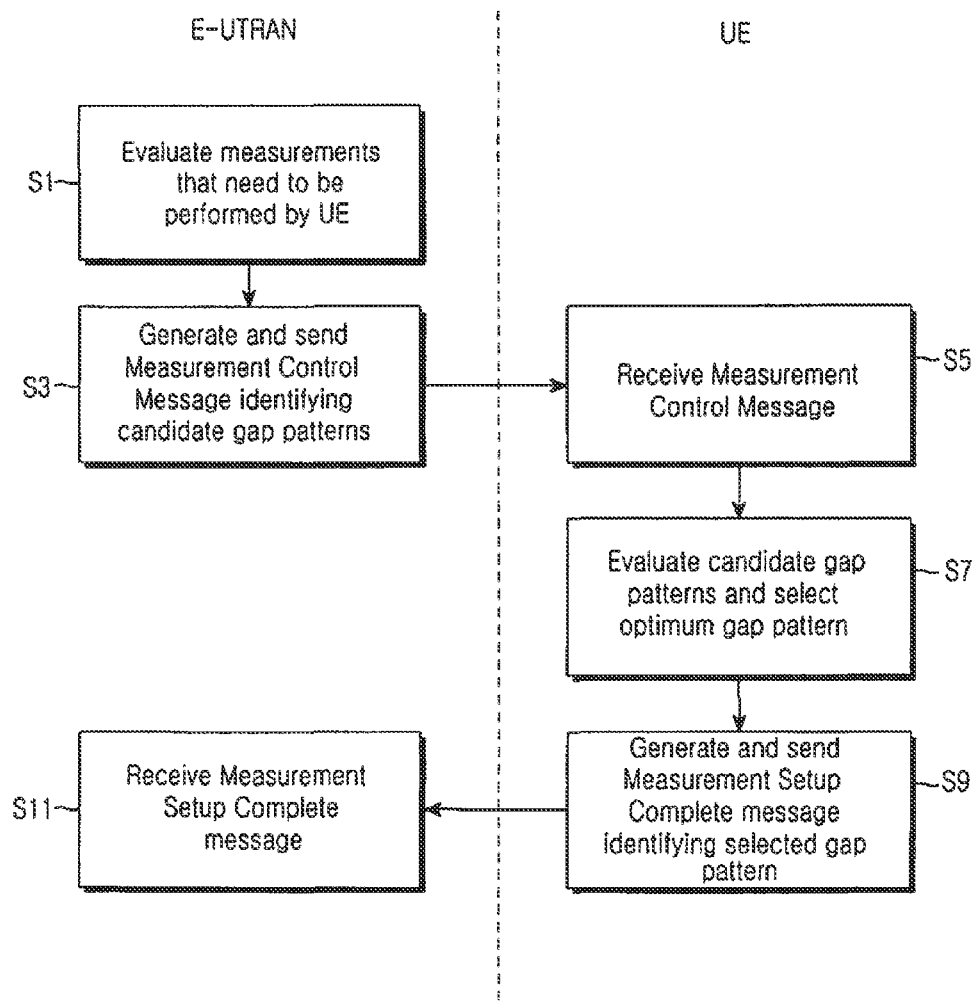
FIG. 4 is a flow chart illustrating main operations performed during a measurement configuration process according to the present invention.

Set-up of the measurement configuration will now be described with reference to FIG. 4. As shown in FIG. 4, the E-UTRAN first evaluates, at step S1, the handover-related measurements that need to be performed by a particular UE 1. The E-UTRAN then generates and sends, at step S3, a Measurement Control Message to the UE 1. The Measurement Control Message has the format set out in Table 1.

TABLE 1

| Information Element/Group name | Description |
| --- | --- |
| Message Type | |
| RRC transaction identifier | |
| Integrity check info | |
| Measurement identity | Identifies the measurement |
| Measurement command | Indicates if the measurement is used to setup, modify or release a measurement |
| Measurement configuration | Included in case the 'Measurement Command' is set to setup or modify a measurement |
| Candidate gap patterns | The candidate transmission/reception gap patterns from which the UE is allowed to select. Included for measurement types requiring transmission/reception gaps. |
| Smeasure | If the current cell's quality is below the threshold indicated by this parameter, the UE shall start the measurement/perform the measurements more frequently |
| Additional Parameters | Additional parameters such as reporting mode etc |

The set of candidate gap patterns have a range of gap spacings ranging from a 'worst case' pattern with the largest tolerable gaps, which should be satisfactory for UEs 1 with basic measurement capabilities. Others of the candidate gap patterns have smaller gaps, and these gap patterns may be used by UEs with more advanced measurement capabilities. However, it will be appreciated that as the E-UTRAN sets the candidate gap patterns, the number of gap patterns that need to be supported by the E-UTRAN is controlled by the E-UTRAN.

In the first exemplary embodiment of the present invention, in order to reduce signaling overhead as most of the parameters for the candidate gap patterns are the same apart from the gap pattern length, gap pattern parameters for a candidate gap pattern are only signaled if different from the previous candidate gap pattern. In this way, candidate gap pattern parameters that are common to all of the candidate gap patterns are signaled only once.

The Smeasure parameters are used to limit the measurements that the UE 1 is required to perform in a power-saving connected-mode state. In this embodiment, separate Smeasure parameters are provided for intra-frequency, inter-frequency and inter-RAT measurements. In the case that Hierarchical Cell Structure (HCS) is employed, a separate set of Smeasure parameters is used including Smeasure parameters that may limit the measurements performed to cells with an equal or higher HCS cell priority.

After receiving the Measurement Control Message, at step S5, the UE 1 evaluates, at step S7, the candidate gap patterns and selects the optimum gap pattern for that UE 1. In particular, the UE 1 assesses which of the candidate gap patterns are possible in view of the measurement capabilities of that UE 1, and then selects the candidate gap pattern that has the smallest gaps.

The UE 1 then generates and sends, at step S9, a Measurement Setup Complete signal identifying the selected gap pattern. The Measurement Setup Complete signal is received, at S11, by the E-UTRAN. In this embodiment, the Measurement Setup Complete signal has the format set out in Table 2.

TABLE 2

| Information Element/Group name | Description |
| --- | --- |
| Message Type | |
| RRC transaction identifier | |
| Integrity check info. | |
| Measurement identity | Identifies the measurement |
| Selected gap pattern | The transmission/reception gap pattern selected by the UE taking into account its measurement capabilities |

In the first embodiment of the present invention, the Measurement Control Message and the Measurement Setup Complete Message are transferred using shared channels.

Following completion of the above-described measurement set-up procedure, handover-related measurements are periodically performed. The measurements performed by the UE 1 are synchronized with the selected gap pattern. As will be appreciated by those skilled in the art, the selected gap pattern may be implemented by various different compressed mode techniques, e.g. decreasing the spreading factor or puncturing bits.

The procedure for performing handover-related measurements when in a power-saving connected mode state will now be described with reference to FIG. 5.

Figure 5:
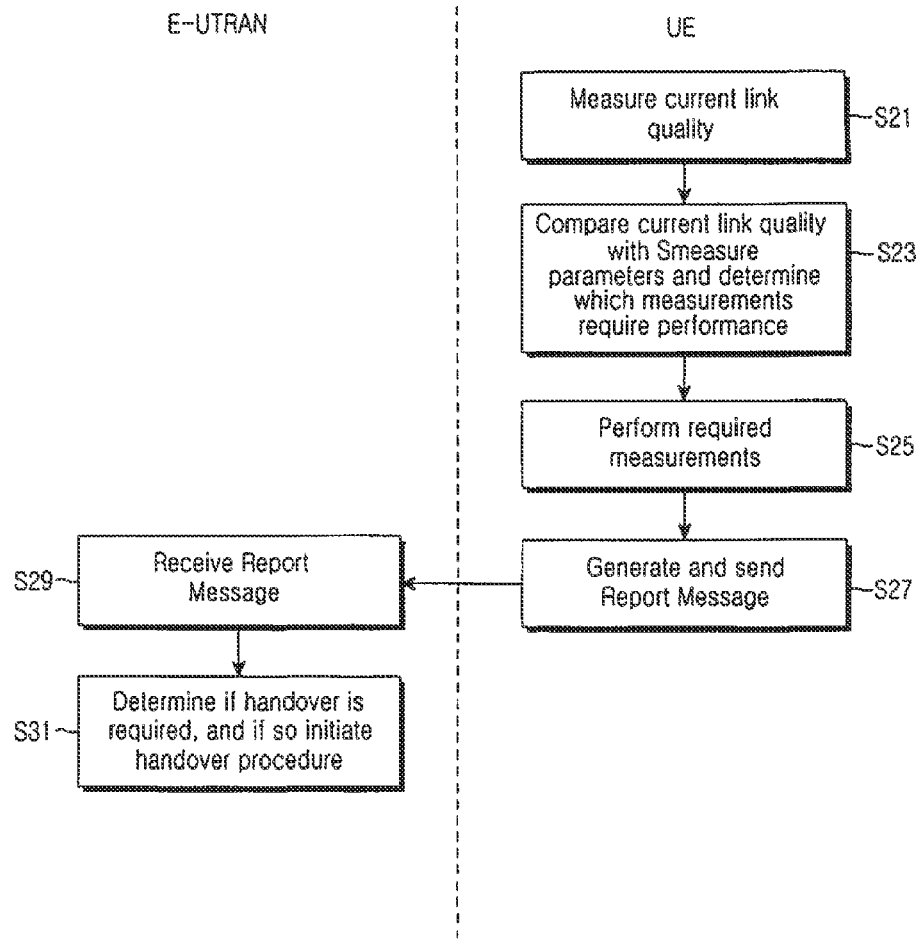
FIG. 5 is a flow chart illustrating main operations performed in a power-saving connected-mode state to determine whether a handover procedure is to be performed according to the present invention.

As shown in FIG. 5, first the UE 1 measures, at step S21, the current link quality. The UE then compares, at step S23, the current link quality with the Smeasure parameters received during the measurement set-up procedure. For each type of measurement (e.g. intra-frequency, inter-frequency or inter-RAT), if the current link quality is greater than the corresponding Smeasure parameter then the UE 1 does not perform that type of measurement. Having determined the measurements requiring performance, the UE 1 performs, at step S25, the required measurements. If certain reporting conditions, set by the E-UTRAN are fulfilled, the UE 1 then generates, at step S27, a Report message indicating the results of the performed measurements and sends the Report message to the E-UTRAN.

Following receipt, at step S29, of the Report message the E-UTRAN determines, at step S31, whether or not a handover procedure must be performed and if so, to which cell the handover should occur. In this embodiment, this determination is performed using the measurement results indicated in the Report message and network traffic information. If the E-UTRAN determines that a handover procedure is to be performed, then the E-UTRAN initiates the handover procedure.

In the first exemplary embodiment of the present invention, candidate gap patterns are sent by the E-UTRAN to the UE 1, and the UE 1 selects the optimum one of the candidate gap patterns in view of the measurement capabilities of that UE 1 and advises the E-UTRAN of the selected gap pattern. A second embodiment will now be described with reference to FIG. 6 in which the UE 1 sends candidate gap patterns to the E-UTRAN, which selects the optimum gap pattern and advises the UE 1 of the selected gap pattern.

Figure 6:
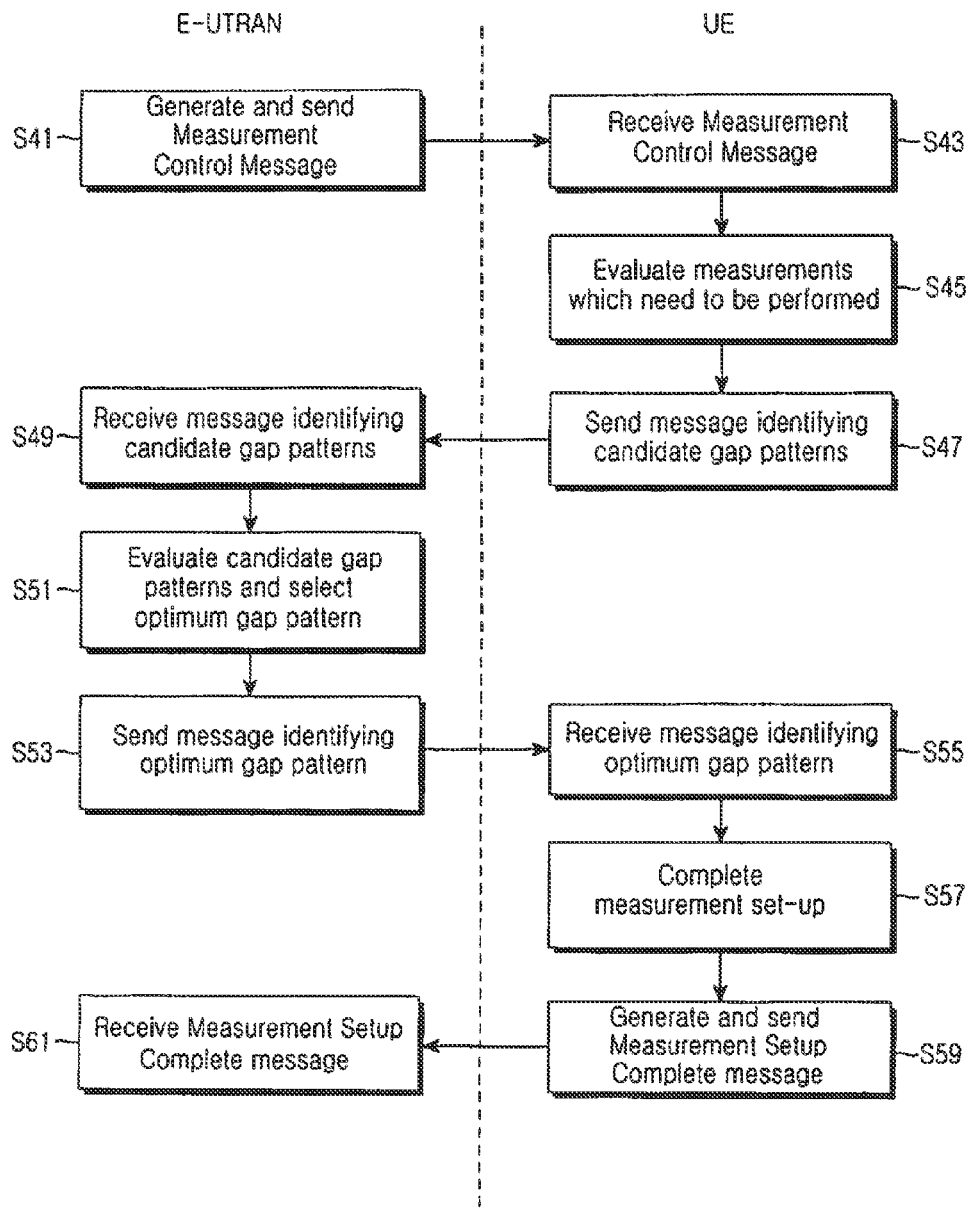
FIG. 6 is a flow chart illustrating main operations performed during a measurement configuration process according to a second embodiment of the invention.

As shown in FIG. 6, the measurement set-up procedure in this embodiment involves the UE 1 generating, at step S41, a Measurement Control Message and sending the Measurement Control Message to the UE 1. The Measurement Control Message differs from the Measurement Control Message of the first exemplary embodiment of the present invention only in that no candidate gap patterns are included.

Following receipt, at step S43, of the Measurement Control Message, the UE 1 evaluates, at step S45, the measurements that need to be performed. The UE 1 then generates and sends, at step S47, a message identifying candidate gap patterns to the E-UTRAN.

Following receipt, at step S49, of the message identifying candidate gap patterns, the E-UTRAN evaluates, at step S51, the candidate gap patterns and selects the optimum gap pattern. The E-UTRAN then sends, at step S53, a message identifying the optimum gap pattern to the UE 1.

Following receipt, at step S55, of the message identifying the optimum gap pattern, the UE 1 completes, at step S57, its set-up for handover-related measurements. The UE 1 then generates and sends, at step S59, a Measurement Setup Complete message to the E-UTRAN. Following receipt, at step S61, by the E-UTRAN of the Measurement Setup Complete message the measurement set-up procedure ends.

In the first exemplary embodiment of the present invention, the E-UTRAN sends a Measurement Control Message including candidate gap patterns. In the second exemplary embodiment of the present invention, the Measurement Control Message sent by the E-UTRAN does not include candidate gap patterns, and the E-UTRAN sends a separate message identifying the candidate gap patterns.

In the illustrated embodiments, different Smeasure parameters are sent for different types of measurement. Alternatively, a common Smeasure parameter could be sent for either all types of measurements or a plurality of types of measurements.

In the illustrated embodiments, if the current link quality exceeds the Smeasure parameter for a type of measurement, then that measurement is not performed. In an alternative embodiment, if the current link quality exceeds the Smeasure parameter for a type of measurement, then the frequency of performance of that type of measurement is reduced, instead of not performing the measurement.

Those skilled in the art will appreciate that when the connection is in a discontinuous power saving mode, preferably the handover-related measurements are synchronized with the DRX/DTX cycles. In this way, operation of the UE 1 outside of the DRX/DTX periods can be reduced.

Although, according to the first and second exemplary embodiments of the present invention, the Smeasure parameters are only used to determine whether the handover-related measurements performed in a power-saving connected mode, in alternative embodiments of the present invention, the Smeasure parameters are used in the same manner in a normal connected mode.

As discussed in the first and second embodiments, through selection, by one of the E-UTRAN and the UE 1, of a gap pattern from a candidate set of gap patterns provided by the other of the E-UTRAN and the UE 1, the selection of the gap pattern may take into account, the measurement capabilities of the UE 1 while the E-UTRAN still has a level of control over the selection of the gap pattern. It will be appreciated that the use of Smeasure parameters is not required in order to achieve this advantage.

The use of Smeasure parameters allows the number of handover-related measurements to be reduced if the current link quality is good. It will be appreciated that the negotiation between the UE 1 and the E-UTRAN of a gap pattern from a set of candidate gap patterns is not required to achieve this advantage.

It will be appreciated that the term User Equipment (UE) could encompass any type of mobile station including cellular phones, cordless phones and Personal Digital Assistants (PDAs).

For exemplary purposes, the embodiments of the invention have been described in the context of, and using terminology associated with, the E-UTRA scheme. It will be appreciated that the invention can also be implemented in other types of wireless communication scheme. In general, the wireless communication system will include a wireless access network that includes a number of base stations that communicate with mobile stations using wireless links.

The present invention may be implemented by changing the software routines implemented by existing hardware. As such, the invention also extends to computer programs, particularly computer programs on or in a carrier, adapted for putting the invention into practice. The program may be in the form of source code, object code, a code intermediate to source code and object code such as in partially compiled form, or in any other form suitable for using in the implementation of the processes according to the invention.

The carrier may be any entity or device capable of carrying the program. For example, the carrier may comprise a storage medium, such as a Read-Only Memory (ROM), for example a Compact Disk (CD)-ROM or a semiconductor ROM, or a magnetic recording medium, for example a floppy disc or a hard disc, or an optical recording medium. Further, the carrier may be a transmissible carrier such as an electronic or optical signal that may be conveyed via electrical or optical cable or by radio or other means.

The carrier may be an integrated circuit in which the program is embedded, the integrated circuit being adapted for performing, or for use in the performance of, the relevant processes.

While the present invention has been shown and described with reference to preferred embodiments thereof, it will be understood by those skilled in the art that various changes in form and details may be made therein without departing from the spirit and scope of the invention.

What is claimed is:

1. A method for measuring at least one neighboring cell by a User Equipment (UE) in a communication system, the method comprising:
   receiving, from a network, a message representative of an s-Measure including a serving cell quality threshold and gap configuration information used for setting up and releasing measurement gaps;
   setting up a measurement gap configuration indicated by the gap configuration information;
   performing measurement of the at least one neighboring cell based on the s-Measure and the measurement gap configuration; and
   transmitting, to the network, a measurement report based on the measurement, if a condition for the measurement report is fulfilled.

2. The method of claim 1, wherein setting up the measurement gap configuration indicated by the gap configuration information comprises:
   if a previous measurement gap configuration is already set up, releasing the previous set up measurement gap configuration, and setting up the measurement gap configuration indicated by the gap configuration information.

3. The method of claim 1, wherein the serving cell quality threshold controls whether or not the UE is required to perform measurements of an intra-frequency, an inter-frequency, and an inter-Radio Access Technology (RAT) neighboring cell.

4. The method of claim 1, wherein the measurement of the at least one neighboring cell is performed, if a measurement of a serving cell is lower than the s-Measure.

5. The method of claim 1, wherein the measurement is performed on frequencies and Radio Access Technologies (RATs) indicated in the message.

6. The method of claim 1, wherein the message further includes reporting information, and
   wherein transmitting the measurement report comprises transmitting the measurement report based the reporting information.

7. A User Equipment (UE) in a communication system, the UE comprising:
   a transceiver configured to receive, from a network, a message representative of an s-Measure including a serving cell quality threshold and gap configuration information used for setting up and releasing measurement gaps; and
   a controller configured to set up a measurement gap configuration indicated by the gap configuration information, performing measurement of the at least one neighboring cell based on the s-Measure and the measurement gap configuration, and to control the transceiver to transmit, to the network, a measurement report based on the measurement, if a condition for the measurement report is fulfilled.

8. The UE of claim 7, wherein the controller, if a previous measurement gap configuration is already set up, releases the previous set up measurement gap configuration, and sets up the measurement gap configuration indicated by the gap configuration information.

9. The UE of claim 7, wherein the serving cell quality threshold controls whether or not the UE is required to perform measurements of an intra-frequency, an inter-frequency, and an inter-Radio Access Technology (RAT) neighboring cell.

10. The UE of claim 7, wherein the measurement of the at least one neighboring cell is performed, if a measurement of a serving cell is lower than the s-Measure.

11. The UE of claim 7, wherein the measurement is performed on frequencies and Radio Access Technologies (RATs) indicated in the message.

12. The UE of claim 7, wherein the message further includes reporting information, and
wherein the transceiver transmits the measurement report based the reporting information.

13. A method for transmitting information for measurement of at least one neighboring cell by a network in a communication system, the method comprising:
transmitting, to a User Equipment (UE), a message representative of an s-Measure including a serving cell quality threshold and gap configuration information used for setting up and releasing measurement gaps; and
receiving, from the UE, a measurement report based on a measurement of the at least one neighboring cell, if a condition for the measurement report is fulfilled,
wherein the measurement of the at least one neighboring cell is performed based on the s-Measure and a measurement gap configuration indicated by the gap configuration information.

14. The method of claim 13, wherein, if a previous measurement gap configuration is already set up, the previous set up measurement gap configuration is released and the measurement gap configuration indicated by the gap configuration information is set up.

15. The method of claim 13, wherein the serving cell quality threshold controls whether or not the UE is required to perform measurements of an intra-frequency, an inter-frequency, and an inter-Radio Access Technology (RAT) neighboring cell.

16. The method of claim 13, wherein the measurement of the at least one neighboring cell is performed, if a measurement of a serving cell is lower than the s-Measure.

17. The method of claim 13, wherein the measurement of the at least one neighboring cell is performed on frequencies and Radio Access Technologies (RATs) indicated in the message.

18. The method of claim 13, wherein the message further includes reporting information, and
wherein the measurement report is transmitted by the UE based the reporting information.

19. A network in a communication system, the network comprising:
a transceiver configured to transmit, to a User Equipment (UE), a message representative of an s-Measure including a serving cell quality threshold and gap configuration information used for setting up and releasing measurement gaps, and receive, from the UE, a measurement report based on a measurement of at least one neighboring cell, if a condition for the measurement report is fulfilled,
wherein the measurement of the at least one neighboring cell is performed based on the s-Measure and a measurement gap configuration indicated by the gap configuration information.

20. The network of claim 19, wherein, if a previous measurement gap configuration is already set up, the previous set up measurement gap configuration is released and the measurement gap configuration indicated by the gap configuration information is set up.

21. The network of claim 19, wherein the serving cell quality threshold controls whether or not the UE is required to perform measurements of an intra-frequency, an inter-frequency, and an inter-Radio Access Technology (RAT) neighboring cell.

22. The network of claim 19, wherein the measurement of the at least one neighboring cell is performed, if a measurement of a serving cell is lower than the s-Measure.

23. The network of claim 19, wherein the measurement of the at least one neighboring cell is performed on frequencies and Radio Access Technologies (RATs) indicated in the message.

24. The network of claim 19, wherein the message further includes reporting information, and
wherein the measurement report is transmitted by the UE based the reporting information.

* * * * *